(No Model.)
E. O. DANIELS.
DEVICE FOR BENDING PIPE.
No. 361,398. Patented Apr. 19, 1887.
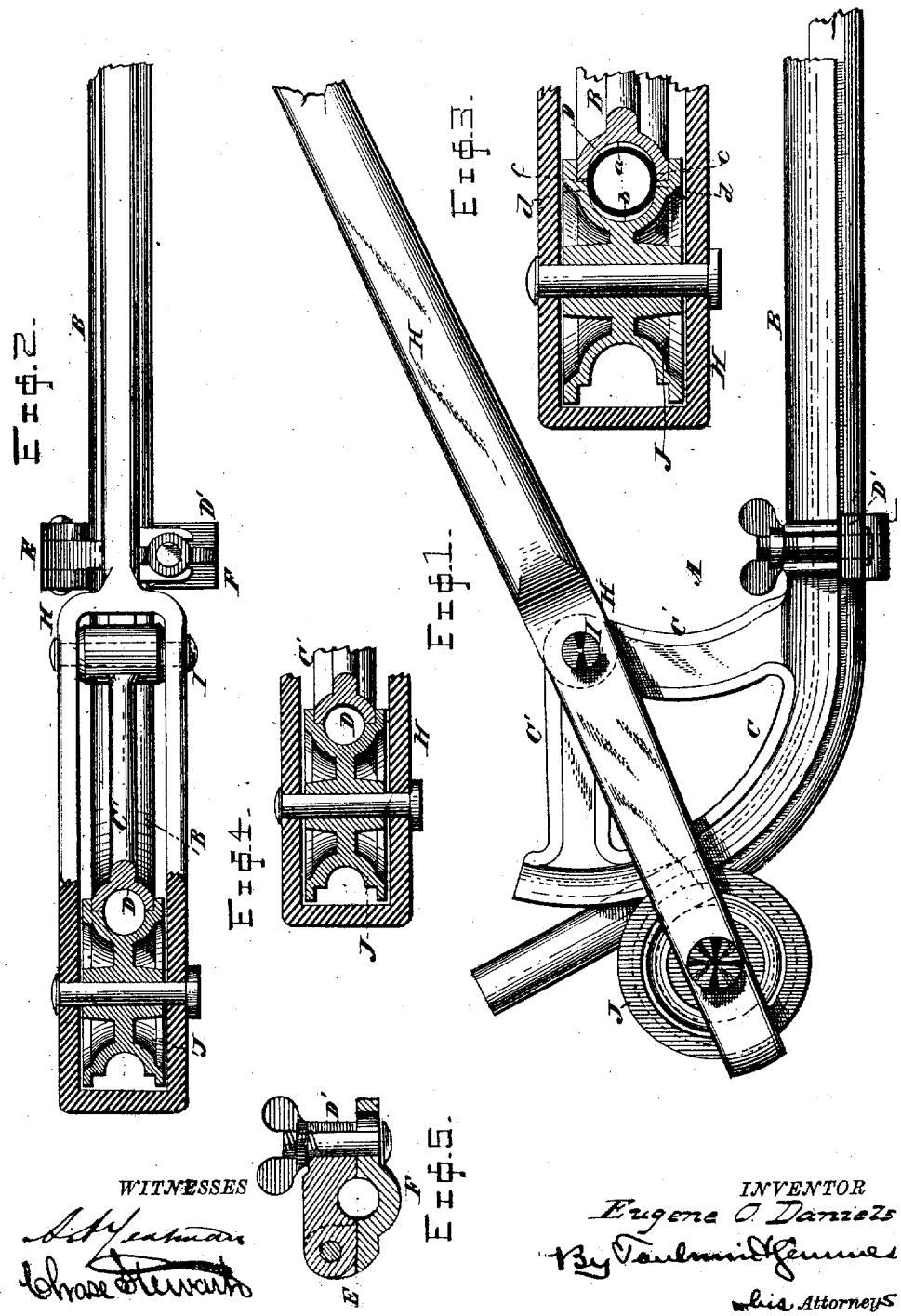
WITNESSES
INVENTOR
Eugene O Daniels
By Toulmin & Gemmel
his Attorneys

UNITED STATES PATENT OFFICE.

EUGENE ORA DANIELS, OF SPRINGFIELD, OHIO.

DEVICE FOR BENDING PIPE.

SPECIFICATION forming part of Letters Patent No. 361,398, dated April 19, 1887.

Application filed January 10, 1887. Serial No. 223,898. (No model.)

*To all whom it may concern:*

Be it known that I, EUGENE ORA DANIELS, a citizen of the United States, residing at Springfield, in the county of Clark and State of Ohio, have invented certain new and useful Improvements in Pipe-Bending Tools, of which the following is a specification, reference being had therein to the accompanying drawings.

This invention relates to improvements in tools for bending pipes into segmental curvatures of more or less length, or into complete circles.

My invention consists, essentially, of a bar constituting a pipe-former having a groove in one side and curved at one end, and a clamp to clamp the pipe, and of a lever pivoted to it and carrying a roller which has a groove agreeing in cross-section with the shape of the groove in the bar, and which travels upon the curved portion of the bar when the lever is actuated.

My invention further consists in making the groove in the bar and the groove in the roller, when the bar and roller are brought together or in juxtaposition, form an ellipse, so that a round pipe when placed between the bar and the roller shall have a slight space along the inner and outer peripheries, while it will touch the grooves at the sides, the peculiar advantages of which will be hereinafter made to appear. It should, however, be also noted at this point that I bend the pipes without resorting to the usual method of first filling the same with some material to prevent the pipe from collapsing while being bent, and which is afterward removed from the pipe, as by being melted, if the filling is of a nature capable of being made to run by the application of heat. This operation of filling and unfilling has been long practiced, but is so expensive as to render it impracticable in certain arts—as in the art of manufacturing tubular lightning-rods, in which numerous and greatly-varying bends are necessary to round the eaves and cornices of different sizes and shapes upon the various buildings. My invention, however, as I have learned by actual usage, overcomes this old difficulty, and renders the proper bending of the pipes practical and comparatively inexpensive, and without filling.

In the accompanying drawings, forming a part of this specification, and on which like reference-letters indicate corresponding parts, Figure 1 represents a side elevation of my pipe-bending tool with a pipe undergoing operation; Fig. 2, a partial plan and partial sectional view of the same without a pipe; Fig. 3, an enlarged sectional view of a portion of tool, showing more plainly the elliptical contour of the parts which receive and bend the pipe, and pipe therein; Fig. 4, a like view showing a circular contour to such parts, and Fig. 5 a detail sectional view of the clamping device.

The letter A refers to what I shall term the "receiving" and "forming" part of the tool, and this consists of a metallic bar, B, curved at C into a segment of any desired length or number of degrees, and having a groove, D, in one face thereof, which forms a seat for the pipe and a former by which its curvature is determined. The cross-section contour of this groove is made semi-elliptical or semicircular, the former preferred. The reason of this preference is that the spaces between the pipe and the seat and engaging-surface at $a\ b$ allow the metal of the pipe, when severely pressed at the points $c\ d$, to spread or expand radially toward the points $a\ b$, and thus prevent the flattening of the pipe during the operation of bending it. To prevent this flattening has been an end always in view in bending pipes, and has for a long time proved a source of trouble; hence the usual filling already alluded to. Another advantage of allowing the expansion alluded to is that it prevents the breaking or cracking of the pipe during the bending operation, as the pressure on the pipe at the points $c\ d$ and the freedom to expand toward $a\ b$ compensate for the distortion the molecules of the metal undergo.

From the bar B extend two arms, C', which form a fulcrum-support for the other part of the tool. From the bar also project lugs D' and E, to which latter is pivoted a clamping-plate, F, having a recess to receive the pipe, and held to the other lug by a bolt and nut, G. By this means the pipe is secured firmly to the bar B, which is necessary. Of course other forms of fastening devices may be employed. The letter H refers to the movable part of the tool, the same consisting of a lever pivoted at I, and thence bifurcated or slotted, as seen in Fig. 2, and provided with an anti-friction pipe engaging roller J. This roller is provided with a peripheral groove whose cross-section contour is, as already suggested, preferably elliptical, for the purpose also hereinbefore mentioned. The position of the roller J on the lever is such that it travels smoothly on the segmental section of the bar B, while the bar and roller are constructed so as to engage each other to prevent lateral displacement of either with respect to the other. The groove in the segment and the groove in the roller also accurately register, so that both constitute an elliptical or circular—or such shape as agrees with the cross-section of the pipe—groove or passage, for the purpose already made known. The length of the straight portion of the bars may be varied to suit circumstances, but is generally about eighteen inches, while the segment may extend through forty-five degrees or more, the more including one hundred and eighty degrees, or a complete circle, if desired. With a mere segment of forty-five degrees, however, I can bend a pipe into a circle by projecting it farther and farther through the segment as each section is bent. I can also vary the degrees of the angle in the pipe even with the same segment by running the roller more or less around the segment, thus securing an obtuse, a right, or an acute angle, as may be needed. This is useful in shaping a section of lightning-rod pipe to extend round a building-cornice. My improved tool, it will be noted, is useful as well as a roof-tool, to be used in putting up tubular lightning-rods, as a shop-tool, to be used in manufacturing devices and implements and apparatus in which bent pipes are needed.

Having thus fully described my invention, what I claim as new, and desire to secure by Letters Patent, is—

1. In a pipe-bending tool, the combination, with a former having a pipe-seat whose cross-section is semi-elliptical, and a portion whereof forms the arc of a circle, of a roller having a pipe-engaging groove whose cross-section is also semi-elliptical, and which registers with the arc portion, and a lever carrying the roller and mounted to move it concentrically with that arc and cause it to engage and bend the pipe.

2. In a pipe-bending tool, the combination, with a bar curved at one end and having lugs, a pivoted clamping-plate, and bolt and arms which form a fulcrum-support, and a groove in one face thereof semi-elliptical in cross-section, of a lever pivoted in said fulcrum-support and slotted at its shorter end and an anti-friction roller mounted in said slot and against said arc and having a groove semi-elliptical in cross-section.

3. In a pipe-bending tool, the combination, with a bar curved at one end and having lugs, a pivoted clamping-plate and bolt, arms which form a fulcrum-support, and a groove in one face thereof, of a lever pivoted in said fulcrum-support and slotted at its shorter end and an anti-friction roller mounted in said slot and against said arc and having a groove in its periphery.

4. In a pipe-bending tool, a former having a groove semi-elliptical in cross-section.

In testimony whereof I affix my signature in presence of two witnesses.

EUGENE ORA DANIELS.

Witnesses:
A. A. YEATMAN,
CHASE STEWART.